US011131194B2

(12) United States Patent
Vinski et al.

(10) Patent No.: US 11,131,194 B2
(45) Date of Patent: Sep. 28, 2021

(54) APEX SEAL ARRANGEMENT FOR ROTARY INTERNAL COMBUSTION ENGINE

(71) Applicant: PRATT & WHITNEY CANADA CORP., Longueuil (CA)

(72) Inventors: Johnny Vinski, Chateauguay (CA); David Gagnon-Martin, Longueuil (CA); Jean-Gabriel Gauvreau, Varennes (CA); Roger Huppe, Chambly (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 263 days.

(21) Appl. No.: 16/382,776

(22) Filed: Apr. 12, 2019

(65) Prior Publication Data
US 2020/0325777 A1 Oct. 15, 2020

(51) Int. Cl.
| | | |
|---|---|---|
| *F01C 19/10* | (2006.01) | |
| *F01C 19/02* | (2006.01) | |
| *F02B 53/00* | (2006.01) | |

(52) U.S. Cl.
CPC .............. *F01C 19/10* (2013.01); *F01C 19/02* (2013.01); *F02B 53/00* (2013.01); *F02B 2053/005* (2013.01)

(58) Field of Classification Search
CPC ........ F01C 19/005; F01C 19/02; F01C 19/10; F02B 2053/005
See application file for complete search history.

(56) References Cited

U.S. PATENT DOCUMENTS

| | | | |
|---|---|---|---|
| 3,485,217 A | | 12/1969 | Irgens |
| 3,874,829 A | * | 4/1975 | Pratt ....................... F01C 19/04 418/115 |
| 3,915,600 A | | 10/1975 | Lamm |
| 3,963,388 A | * | 6/1976 | Goloff ..................... F01C 19/10 418/121 |
| 3,973,882 A | | 8/1976 | Winchell |

\* cited by examiner

*Primary Examiner* — Mary Davis
(74) *Attorney, Agent, or Firm* — Norton Rose Fulbright Canada LLP (57) ABSTRACT

A rotor assembly for a rotary internal combustion engine is provided. The rotor assembly includes a rotor having a radial groove defined radially in a peripheral surface of the rotor. The groove has a depth and an intermediate shoulder at an intermediate depth. The groove has a first width therealong that is narrower than an intermediate width at the shoulder. An apex seal is received in the groove and protrudes from the peripheral face of the rotor. The apex seal is configured to move radially between a first position and a second position outward of the first position. A biasing member biases the apex seal toward the second position. A platform is disposed in the groove between the apex seal and the biasing member and has a width greater than the first width.

19 Claims, 5 Drawing Sheets

APEX SEAL ARRANGEMENT FOR ROTARY INTERNAL COMBUSTION ENGINE

TECHNICAL FIELD

The application relates generally to an internal combustion engine and, more particularly, to sealing arrangements for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor.

The space around the rotor within the rotor cavity defines a number of working chambers which are sealed from one another in order for the engine to work efficiently. Prior art sealing arrangements typically have a spring in direct contact with an underside of a seal to bias the seal against the peripheral wall of the rotor cavity. This configuration may result in reduced longevity of the sealing arrangements over time.

SUMMARY

In one aspect, there is provided a rotor assembly for a rotary internal combustion engine, the rotor assembly comprising: a rotor having a radial groove defined radially in a peripheral surface of the rotor, the groove having a depth and an intermediate shoulder at an intermediate depth, the groove having a first width therealong that is narrower than an intermediate width at the shoulder; and an apex seal received in the groove and protruding from the peripheral face of the rotor, the apex seal configured to move radially between a first position and a second position outward of the first position, a biasing member biasing the apex seal toward the second position, and a platform disposed in the groove between the apex seal and the biasing member, the platform having a width greater than the first width.

In another aspect, there is provided a rotary internal combustion engine comprising: a stator body having a cavity defined by two axially spaced apart end walls and a peripheral wall extending between the end walls; a rotor having two axially spaced apart end faces each extending in proximity of a respective one of the end walls of the stator body, and a peripheral face extending between the end faces and defining an apex portion, the rotor body being engaged to an eccentric shaft to rotate within the cavity with the apex portion remaining adjacent the peripheral wall; at the apex portion the rotor having a groove extending radially inwardly into the rotor, the groove defining a shoulder at a radial distance from a radial end of the groove; an apex seal received in the groove and protruding radially from the peripheral face of the rotor, the apex seal configured to move along the groove between a first radial position set by the shoulder and a second radial position radially outward relative to the first radial position; a biasing member received in the groove, the biasing member biasing the apex seal radially outwardly toward the second radial position; and a platform received in the groove between the apex seal and the biasing member, the platform engaging the shoulder of the groove when the apex seal reaches the first radial position.

In a further aspect, there is provided a method of operating an apex seal engaged in a radial groove at an apex portion of a rotor of a rotary internal combustion engine, the method comprising: allowing a radial travel of the apex seal along the groove over a distance defined between a first radial position and a second radial position, biasing the apex seal radially outward toward the second radial position via a biasing member, and interfacing a platform with a shoulder defined in the groove at a radial distance from an end of the groove when the apex seal reaches the first radial position, the platform located between the apex seal and the biasing member.

DESCRIPTION OF THE DRAWINGS

Reference is now made to the accompanying figures in which.

DETAILED DESCRIPTION

Figure 1:
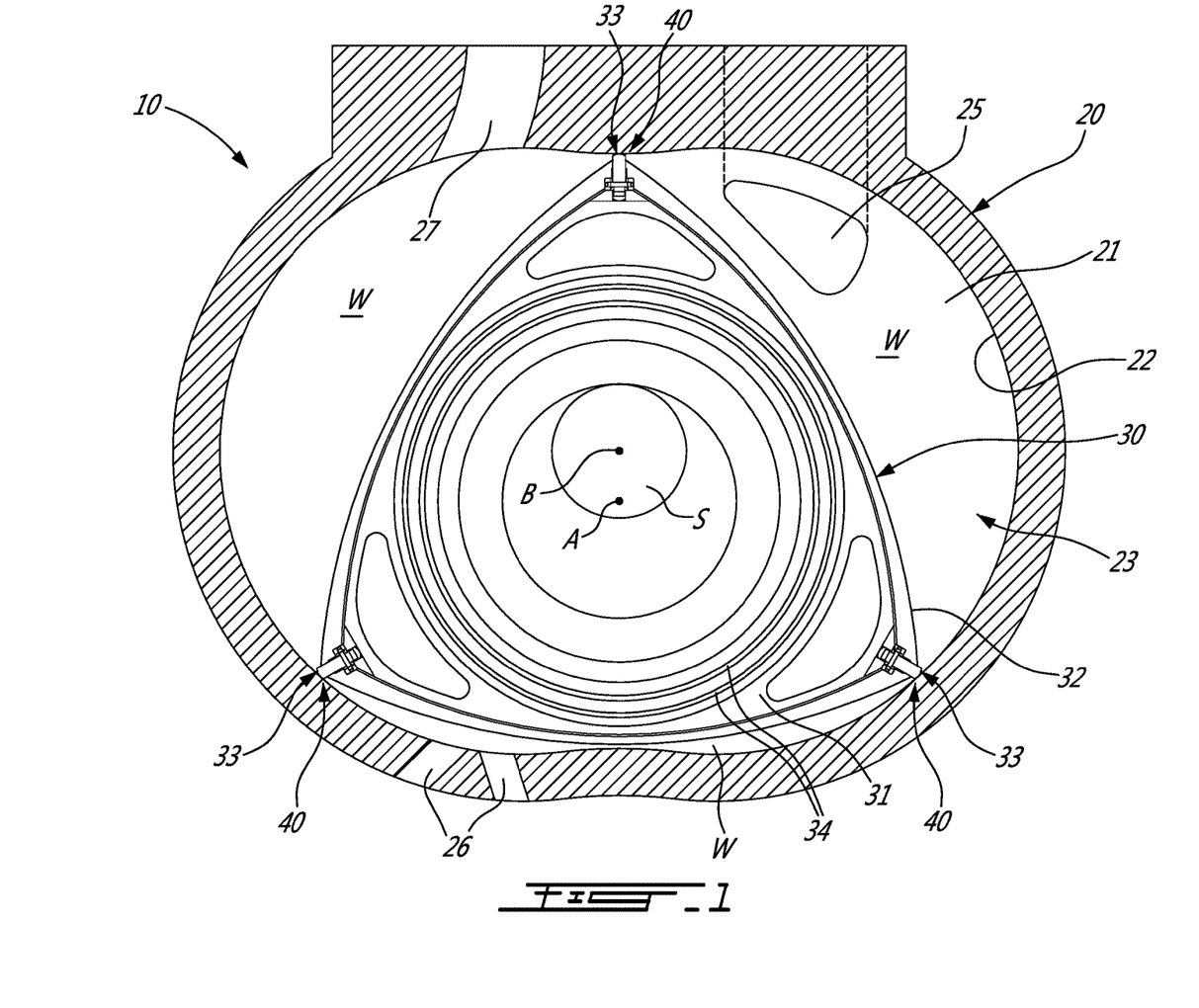
FIG. 1 is a schematic cross-sectional view of a rotary internal combustion engine having a rotor in accordance with one embodiment.

Referring to FIG. 1, a rotary internal combustion engine 10, which is a Wankel engine in this example, is schematically shown. The engine 10 comprises an outer body 20, which may be referred to as a stator body, having axially-spaced end walls 21 with a peripheral wall 22 extending therebetween to form a rotor cavity 23. The inner surface of the peripheral wall 22 of the cavity 23 has a profile defining two lobes, which may be an epitrochoid.

The engine 10 includes a rotor assembly having an inner body or rotor 30 received within the cavity 23. The rotor 30 has axially spaced end faces 31 adjacent to the outer body end walls 21, and a peripheral face 32 extending therebetween. In the depicted embodiment, the peripheral face 32 defines three circumferentially-spaced apex portions 33, and a generally triangular profile with outwardly arched sides. As will be detailed further below, the apex portions 33 are in sealing engagement with the inner surface of peripheral wall 22 to form three working chambers W between the rotor 30 and the outer body 20. As shown, an intake port 25 is provided through one of the end walls 21 for admitting air, or air and fuel, into one of the working chambers W. Passages 26 for a spark plug or other ignition mechanism, as well as for one or more fuel injectors (not shown) may be provided through the peripheral wall 22. As shown, an exhaust port 27 is provided through the peripheral wall 22 for discharge of the exhaust gases from the working chambers W. Alternately, the exhaust port 27 and/or the passages 26 may be provided through the end wall 21, and/or the intake port 25 may be provided through the peripheral wall 22.

As shown, the geometrical axis A of the rotor 30 is offset from and parallel to the axis B of the outer body 20. In the embodiment shown, the outer body 20 is stationary while the rotor 30 is journaled on an eccentric portion of a shaft S, the shaft S being co-axial with the geometrical axis A of the outer body 20. Upon rotation of the rotor 30 relative to the outer body 20 the working chambers W vary in volume. During engine operation the working chambers W have a cycle of operation including the four phases of intake, compression, expansion and exhaust, these phases being similar to the strokes in a reciprocating-type internal combustion engine having a four-stroke cycle.

As shown, at least one oil seal ring 34 is disposed in a circular groove in each end face 31 of the rotor 30 between the bearing (not shown) for the rotor 30 on the shaft eccentric S and the face seals. Each oil seal 34 may impede leakage flow of lubricating oil radially outwardly thereof between the respective rotor end face 31 and the outer body end wall 21. Suitable springs (not shown) may be provided for urging each oil seal 34 axially into contact with the adjacent end wall 21 of the outer body 20.

Figure 2:
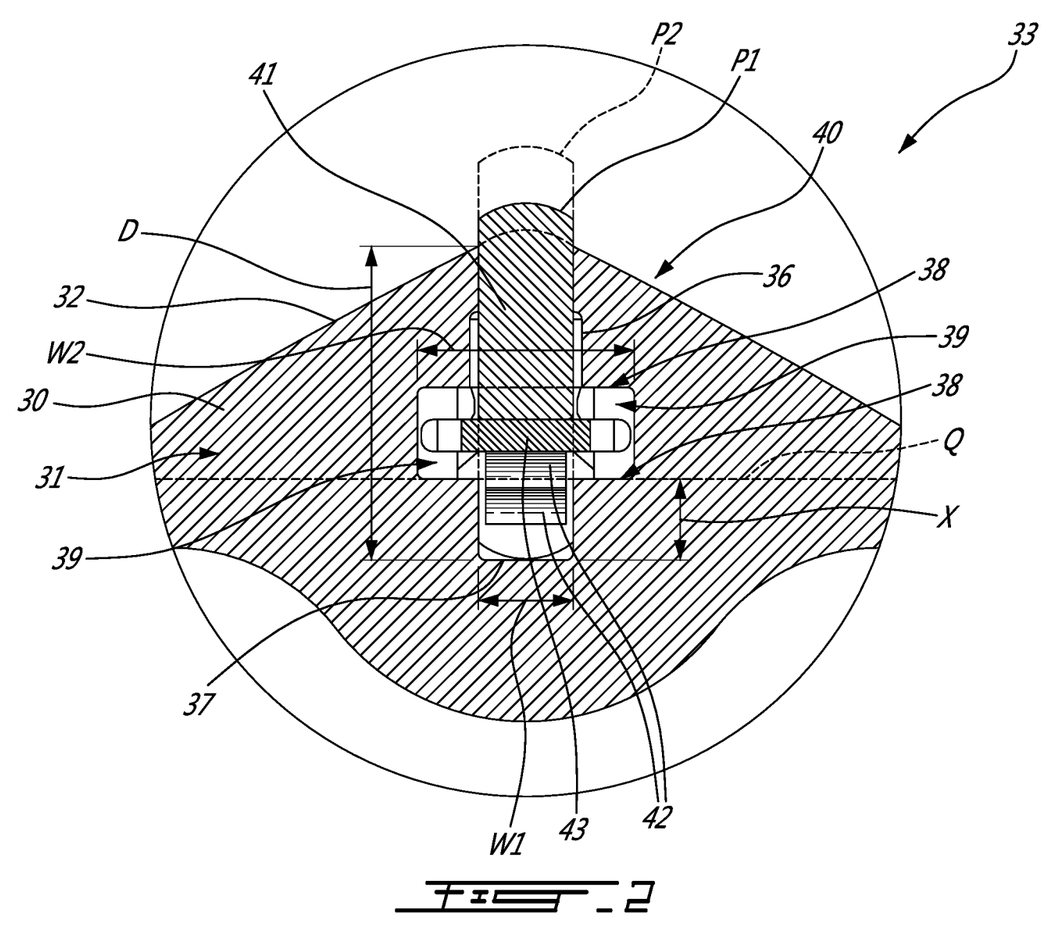
FIG. 2 is a schematic cross-sectional view of a portion of the rotor of the engine of FIG. 1, with an apex seal arrangement.

The working chambers W are separated by apex seals and face or gas seals. Referring to FIG. 2, a schematic cross-sectional view of an apex portion 33 with an apex seal arrangement 40 is shown. The rotor 30 has a radial groove 36 defined in its apex portion 33. The radial groove extends radially inwardly into the rotor 30. The groove 36 may extend axially from one end face 31 to the other. The groove 36 has a finite depth D (or "radial depth"), taken from the peripheral face 32 to a radial end 37 of the groove 36. As shown, the groove 36 extends radially inward toward the geometrical axis A of the rotor 30. The groove 36 defines an abutment, or a shoulder 38, at a radial distance X from the radial end 37 of the groove 36 or intermediate depth of the groove 36. Such radial distance X may vary depending on the embodiments.

The shoulder 38 allows for limiting a radial movement (radially inward and/or radially outward movement) of the apex seal 41 within the groove 36 during operation of the engine 10. The shoulder 38 may be defined in many suitable ways. In the embodiment shown, the shoulder 38 extends on both sides of the groove 36. Stated differently, the shoulder 38, in this embodiment, extends transversally to the depth D or radial dimension of the groove 36. The shoulder 38 is located at an intermediate depth within the groove 36. The shoulder 38 may thus be referred to as an intermediate shoulder, in some embodiments. The shoulder 38 may be viewed as a lateral extension of the groove 36. In other words, the shoulder 38 defines laterally extending voids 39 on both sides of the groove 36 and are opened toward the groove 36. The groove 36 and the laterally extending voids 39 may thus be viewed as one continuous groove 36 having a non-rectilign cross-section. For instance, when so considered, the groove 36 has a width W1 therealong that is narrower than an intermediate width W2 at the shoulder 38. In the embodiment shown, the groove 36 has a cruciform cross-section when viewed in a plane transverse to the geometrical axis A of the rotor 30, with a radial extension from the peripheral face 32 of the rotor 30 to the radial end 37 of the groove 36, and two lateral "wings" extending transversally (i.e. in this case perpendicular) to the radial extension of the groove 36 at an intermediate depth of the groove 36. In other embodiments, the shoulder 38 may be defined as a single lateral extension on one side of the groove 36.

In the embodiment shown, the shoulder 38 has a flat surface extending along a plane Q transverse, in this case perpendicular, to the radial extension of the groove 36. The shoulder 38 may have a flat surface angled relative to said plane Q, with the flat surface oriented toward a radial center line of the groove 36. As such, in embodiments where the shoulder 38 is defined along the groove 36 and extends on both sides of the groove 36, the shoulder 38 may have a pair of flat surfaces on opposed sides of the groove 36, along the radial extension of the groove 36, that face toward the radial center line of the groove 36. Other configurations of the shoulder 38 may be contemplated in other embodiments. For instance, in other embodiments, the shoulder 38 may have non-flat surfaces, such as rounded or relief surfaces. The shoulder 38 may interface with a part of the apex seal arrangement 40, as discussed later. The groove 36, including the laterally extending voids 39 shown in this embodiment, are configured to receive components of the apex seal arrangement 40. The configuration of the laterally extending voids 39 and cooperation of the shoulder 38 and features of the apex seal arrangement 40 allow a permitted radial travel of the apex seal 41 before it bottoms out or is restrained from further radially inward and/or outward movement within the groove 36, as described later.

Figure 3:
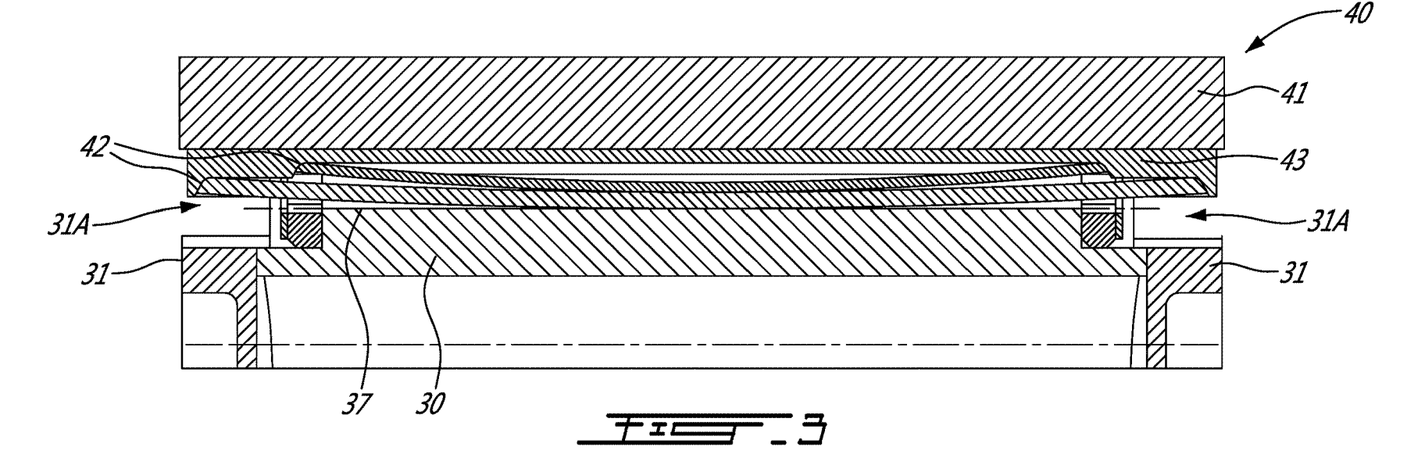
FIG. 3 is a schematic axial view of the portion of the rotor of FIG. 2 with components of the apex seal arrangement shown.
Figure 4:
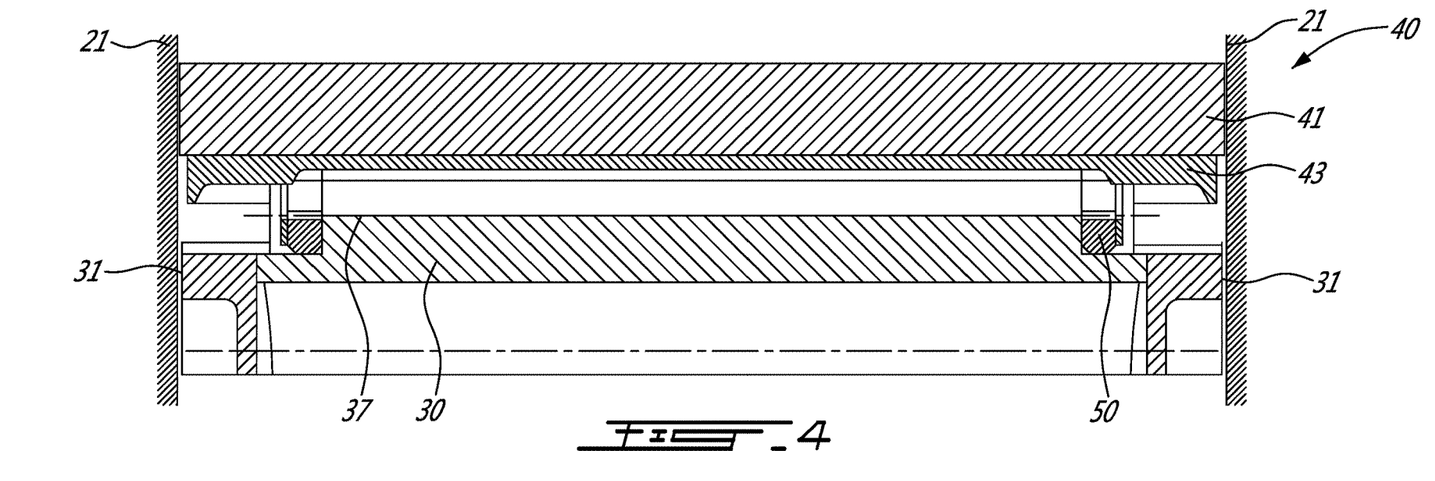
FIG. 4 is a schematic axial view of the portion of the rotor of FIGS. 2-3 with the biasing member of the apex seal arrangement removed for clarity.

With reference to FIGS. 2 to 4, components of the apex seal arrangement 40 are shown within the groove 36 at the apex portion 33 of the rotor 30. The apex seal arrangement 40 includes an apex seal 41, a biasing member 42 and a platform 43 between the apex seal 41 and the biasing member 42.

During operation of the rotary engine 10, the interaction between the apex seal arrangement 40 and the groove 36 which receives said apex seal arrangement 40 is such that the apex seal 41 is configured to move radially (radially or generally radially) along the groove 36 between a first position P1 and a second position P2 over a predetermined distance. This is shown in FIG. 2. In other words, the apex seal 41 has a radial travel along the groove 36 over a distance defined between a first position P1 and a second position P2 outward relative to the first position P1. In an embodiment, the predetermined distance is 0.075±0.02 inch. The first position P1 is set by the shoulder 38. In other words, the shoulder 38 limits the radial travel of the apex seal 41 when the platform 43 engages it. The platform 43 may thus act as a radial stopper to limit the radial travel of the apex seal 41 as the platform 43 interfaces with the shoulder 38 of the groove 36 when the apex seal 41 reaches the first position P1. In some embodiments, such as the one shown, the shoulder 38 is a first shoulder 38 defined along the groove 36, and there is a second shoulder 38 defined along the groove 36, where the second shoulder 38 sets the second position P2 of the apex seal 41. The platform 43 may thus engage the second shoulder 38 when the apex seal 41 reaches the second position P2. The first and second shoulders 38 may be respectively referred to as the inward end travel abutment or radially inward end travel abutment of the apex seal 41/platform 43 and the outward end travel abutment or radially outward end travel abutment of the apex seal 41/platform 43.

The apex seal 41 is received in the groove 36, and protrudes radially from the rotor 30. The apex seal 41 in the embodiment shown extends axially beyond both end faces 31, and has an axial dimension which is close to a distance between the two end walls 21 of the cavity 23, taking into consideration such things as the difference in thermal expansion between the material(s) of the outer body 20 and the material of the apex seal 41, which in a particular embodiment is made of a suitable type of ceramic. Although the apex seal 41 is shown has a unitary piece, a.k.a as a monolithic piece which forms a single seal member, alternately the apex seal 41 may be composed of two or more cooperating seal members.

Figures 5, 6:
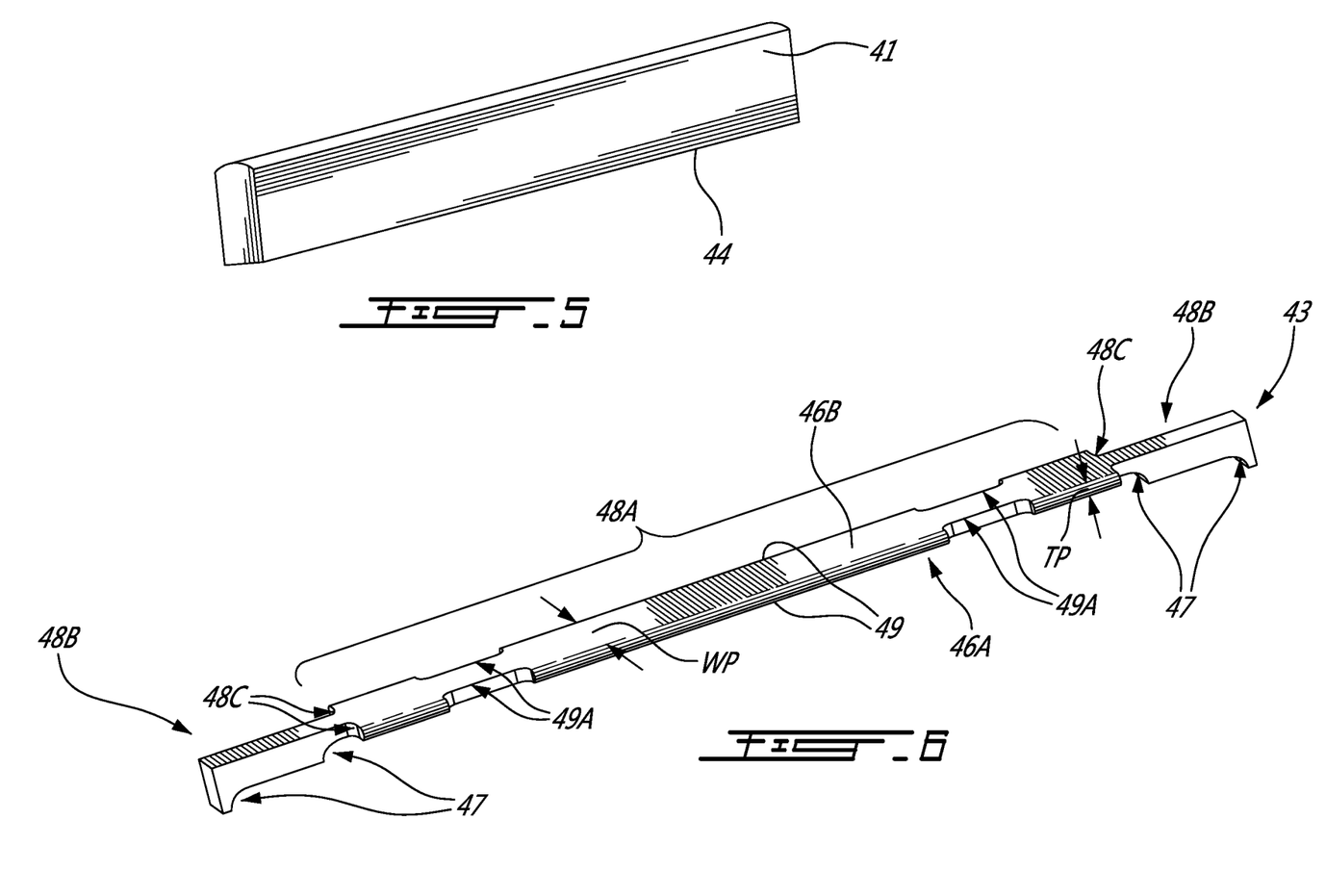
FIG. 5 is a schematic perspective view of an example of an apex seal of the apex seal arrangement shown in FIGS. 1-4.
FIG. 6 is a schematic perspective view of an example of a platform of the apex seal arrangement shown in FIGS. 1-4.

Referring to FIG. 5, an example of an apex seal 41 is shown in isolation. The apex seal 41 has a substantially rectangular shape, with an underside surface 44 that is flat or substantially flat. This may limit stress concentration zones in the geometry of the apex seal 41 and may result in a more robust apex seal 41. However, in other embodiments, the underside surface 44 may be curved or have relief therein, without substantially increasing stress concentration zones occurrences in the underside surface 44 of the apex seal 41. The underside surface 44 of the apex seal 41 interfaces with the platform 43, as will be discussed later.

Returning to FIG. 2, the biasing member 42 biases the apex seal 41 radially outwardly toward the peripheral wall 22 of the cavity 20 of the outer body 20. In other words, the biasing member 42 pushes the apex seal 41 radially outwardly away from the peripheral face 32 of the rotor 30 and against the peripheral wall 22 of the cavity 20 (see FIG. 1). In the embodiment shown, the biasing member 42 includes a pair of leaf springs, although a single leaf spring may suffice in other embodiments to ensure sufficient biasing force is exerted on the apex seal 41 to provide suitable sealing pressure of the apex seal 41 against the peripheral wall 22 of the cavity 20. In a particular embodiment, the leaf springs are made of a suitable metal, for example low alloy steel, stainless steel, Ti alloys, and if necessary of a suitable type of super alloy such as, for example, A-286 or Inconell 750. Other types of biasing members 42 may be contemplated in other embodiments.

In the embodiment shown, the two leaf springs are disposed one over another, such that the leaf springs may lie on one another, and their respective longitudinal ends engage with the platform 43. When assembled in the groove 36, the leaf springs are trapped between the platform 43 and the radial end 37 of the groove 36, where such location of the biasing member 43 within the groove 36 may be referred to as a radial end portion of the groove 36. In the embodiment shown, the leaf springs have their longitudinal ends engage with features of the platform 43 configured to receive said longitudinal ends of the leaf springs and the ventral portion of the radialmost one of the leaf springs rests against the radial end 37 (i.e. the bottom) of the groove 36. The leaf springs in this example do not have the same length. As shown, the leaf spring that is the closest from the platform 43 is shorter than the other leaf spring. In a particular embodiment, the longitudinal ends of the leaf springs are curved, so that the portions of the leaf springs contacting the platform 43 are round to minimize sharp edge contact with the platform 43 and as such reduce the risk of damage to the platform 43. The configurations of the leaf springs may be different in other embodiments. For instance, both leaf springs may have the same length and/or disposed side to side instead of on one another and/or flipped upside down to have their ventral portion facing the platform 43 instead of the radial end 37 of the groove 36.

If the apex seal 41 were to fail during operation, for instance if the apex seal 41 were to break or wear abnormally, the biasing member 42 could no longer have an opposing force of the apex seal 41 bearing against the peripheral wall 22 of the outer body 20 to maintain the biasing member 42 in a compressed state. Because of the presence of the platform 43, the biasing member 42 may remain trapped within the groove 36, even if the apex seal 41 were not present. In operation, the biasing member 42 may bias the platform 43 toward the second position P2. Once the platform 43 engages the second shoulder 38, a.k.a. the outward end travel abutment, which coincides with the outwardmost radial position P2, the biasing force exerted by the biasing member 42 on the platform 43 is opposed by the second shoulder 38 engaging the platform 43. As such, since the platform 43 and the second shoulder 38 contact one another, the platform 43 may restrain further radial movement or relaxation of the biasing member 42 and traps the biasing member 42 in the radial end portion of the groove 36. This may prevent the biasing member 42 to escape from the groove 36 during operation of the rotary engine 10, where the biasing member 42 would get pinched between the rotor 30 and the outer body 20, which could be undesirable for the integrity of the rotary engine 10.

As mentioned above, the platform 43 engages the underside surface 44 of the apex seal 41. Referring to FIG. 6, an embodiment of the platform 43 is shown in isolation. As shown, the platform 43 defines opposed sides with a thickness TP of the platform 43 between these opposed sides. The opposed sides define respective first and second surfaces 46A, 46B, where the first surface 46A may engage the biasing member 42 and the second surface 46B may engage the underside surface 44 of the apex seal 41. The second surface 46B, in the depicted embodiment, is flat so as to interface with the flat underside surface 44 of the apex seal 41. However, in other embodiments where, for instance, the underside surface 44 of the apex seal 41 is non-flat, such as relief or curved, for instance, the second surface 46B and the underside surface 44 may have a corresponding relief or shape. Such interface between the apex seal 41 and the platform 43 may provide frictional damping during operation of the engine 10, such that vibrations imparted to the apex seal arrangement 40 during operation of the engine may be dampen by the friction between the platform 43 and the underside surface of the apex seal 41 when both move (move or vibrate) relative to on another.

The first surface 46A may be referred to as the underside surface of the platform 43 with reference to its orientation in use within the rotor 30. The platform 43 has features defined in its underside surface (or "first surface 46A") to engage with the biasing member 42. More particularly, in the embodiment shown, the first surface 46A of the platform 43 defines a pair of longitudinally spaced apart notches 47 to receive the opposite longitudinal ends of the biasing member 42, in this case a leaf spring. The notches 47 face toward the radial end 37 of the groove 36 when the platform 43 is assembled therein. The notches 47 may have the shape of a circle segment (see FIG. 6) with its concavity oriented toward the radial end 37 of the groove 36. As discussed above, as shown in the previous figures, the biasing member 42 includes two leaf springs, but there may have other numbers of leaf springs in other embodiments. In such cases, the first surface 46B of the platform 43 may define a corresponding number of pairs of longitudinally spaced apart notches 47 to receive opposite longitudinal ends of respective leaf springs.

As shown, the platform 43 has two opposed longitudinal end portions protruding from axial ends of a central portion 48A of the platform 43. With reference to what is shown in FIG. 6, the opposed longitudinal end portions are in the form of respective fingers 48B that protrude from the axial ends of the central portion 48A of the platform 43. The notches 47 are defined in the first surface 46A at the opposite longitudinal end portions (or simply "fingers 48B") of the platform 43. The notches 47 thus define radially extending surfaces in the form of circle segments spaced from the longitudinal ends of the platform 43. The fingers 48B are narrower than the width WP of the central portion 48A of the platform 43, such that an axially abutting surface 48C is defined at each axial end of the central portion 48A, on both sides of the fingers 48B. A function of such axially abutting surfaces 48C will be discussed later.

Figure 7:
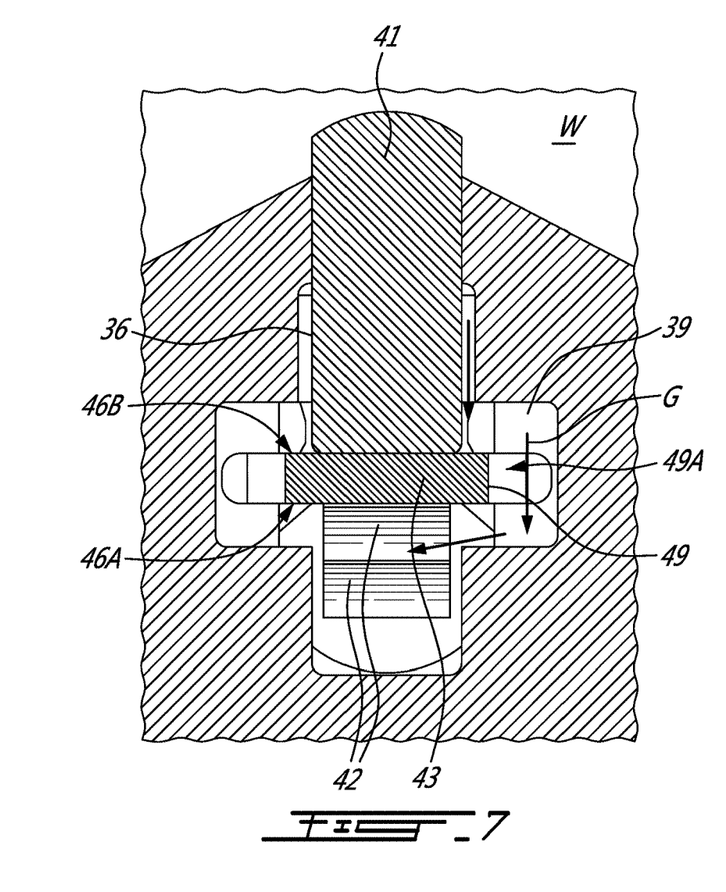
FIG. 7 is a schematic cross-sectional view of the portion of the rotor of the engine of FIG. 1 with an apex seal arrangement.
Figure 8:
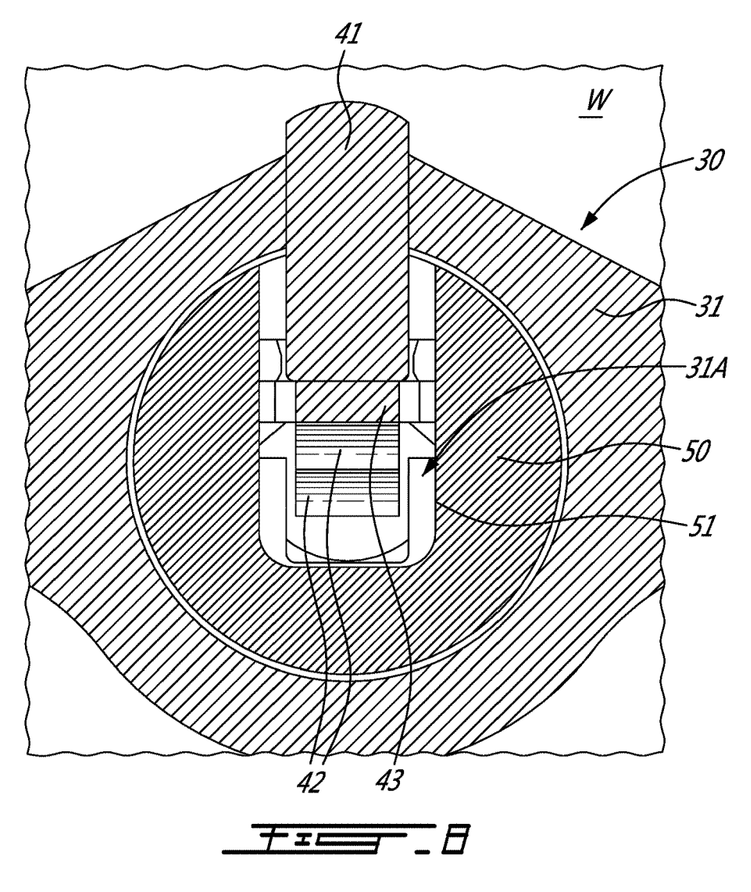
FIG. 8 is a schematic close-up view, at an end face of the rotor, of the portion of the rotor of the engine of FIG. 1.

As shown, the central portion 48A between the opposite fingers 48B of the platform 43 has a varying lateral dimension WP (i.e. width) along its length. In the depicted embodiment, the width WP of at least one portion of the platform 43 is greater than the width W1 of the groove 36 and/or a width of the apex seal 41. As shown at least in FIG. 2, the width WP of at least one portion of the platform 43 is larger than the width W1, and does not extend more than the width W2 of the groove 36 at the shoulder 38. The central portion 48A of the platform 43 has two pairs of indentations 49A defined in both lateral edges 49 of the platform 43. The indentations 49A extends from the first surface 46A to the second surface 46B of the platform 43, i.e. across the full thickness TP of the platform 43. Although in the embodiment shown the platform 43 has two pairs of such indentations 49A, there may be only one, or any number of indentations 49A or zones of reduced width WP of the platform 43, depending on the embodiment. Also, although the embodiment shown has indentations 49A symmetrically defined in the platform 43, this may be different in other embodiments. These zones of reduced width WP may allow to define a gas passage G within the groove 36. This is shown in FIG. 7. In operation, there may have pressurized gas flowing radially inward from a working chamber W into the groove 36, for instance along the interface between the apex seal 41 and the groove 36 from the peripheral face 32 toward the radial end 37 of the groove 36. This may occur because of the manufacturing tolerances of the apex seal 41 and the apex seal receiving portion of the groove 36 and/or pressure peaks inside the working chambers W occurring during normal operation of the rotary engine 10 and acting against the apex seal 41.

The gas passage G may fluidly connect the first and second surfaces 46A, 46B of the platform 43. The gas passage G may thus allow for balancing a gas pressure on the opposed sides of the platform 43 and/or counterbalancing the gas pressure that may apply on the tip of the apex seal 41. As shown, the tip of the apex seal 41 may be rounded, such that pressurized gas may apply a radially inward pressure on part of the tip surface (a portion of the radial periphery) of the apex seal 41, whereby a radially inward pressure may tend to distance or unbias the apex seal 41 from the peripheral wall 22 of the cavity 23. In situations where, for instance, the gas pressure exerted on the second surface 46B of the platform 43 and/or on the tip of the apex seal 41 may be greater than the gas pressure exerted on the first surface 46A of the platform 43, a positive gas pressure may oppose, at least partially, the biasing load of the biasing member 42 on the apex seal 41. If this occur, there may not have a sufficient bias load on the apex seal 41 against the peripheral wall 22 of the outer body 20, which may lead to improper sealing of the working chambers W.

In the embodiment shown, the gas passage G is defined between a lateral edge 49 (i.e. one lateral edge 49 or both lateral edges 49 of the platform 43, depending on where are disposed the zones of reduced width WP), of the platform 43 and an opposing wall of the groove 36, more particularly with reference to the embodiment shown a wall of the laterally extending void 39 that opposes or engage a respective lateral edge 49 of the platform 43. The shape of the indentations 49 may be any suitable shape. The indentations 49A may thus define at least part of the gas passage G within the groove 36. The indentations 49A may be sized such as to limit a restriction of the gas flow between the opposed sides of the platform 43. As at least one portion of the platform 43 is wider than the apex seal 41 in the depicted embodiment, the indentations 49A made in the platform 43 may be disposed on both sides of the apex seal 41, while still having portions of the first and second surfaces 46A, 46B of the platform 43 engageable with the shoulder(s) 38. In some embodiments, the gas passage G may be defined through the platform 43 without such indentations 49A. An aperture (i.e. one or more), for instance in the form of a hole (i.e. one or more), may be defined through the platform 43 in proximity to one or both lateral edge 49 of the platform 43. Other configurations of the groove 36 and/or platform 43 may be contemplated to balance a pressure within the groove 36, including balancing the pressure on opposed sides of the platform 43.

Returning to FIGS. 3-4, at the apex portion 33, each end face 31 includes a recess 31A in communication with the groove 36, and an end plate 50 is received axially therein. Referring to FIG. 7, the end plate 50 is in the form of an end washer axially received in the recess 31A of the end face 31. As such, the apex portion 33 includes two axially spaced apart end plates 50. The end plates 50 are configured to restrain the platform 43 from moving axially within the groove 36. The end plates 50 rest against an axial end of their respective recess 31A. When assembled in the rotor 30, the end plates 50 are restrained from moving axially out of the recess 31A via spring-biased corner seals assembled in the recesses 31A after the end plates 50 are inserted in the recesses 31A, for instance. As can be best seen in FIG. 7, each end plate 50 has an outer peripheral shape that substantially correspond to the recess 31A internal shape. The end plate 50 includes a radial slot 51 defined therein. The slot 51 is open at one side at the periphery of the end plate 50. The slot 51 extends radially across a majority of the end plate 50. In other words, as in the example shown in FIG. 7 the end plate 50 has a circular shape, the slot 51 extends over a majority of the diameter of the end plate 50. When the end plate 50 is assembled in the rotor 30, the slot 51 is in alignment with the groove 36. The slot 51 is configured to engage a corresponding male portion, a.k.a a respective one of the fingers 48B of the platform member 43 of the apex seal arrangement 40. The platform 43 has its fingers 48B received in the aligned slot 51 of respective end plates 50, such that each of the plates 50 receives one finger 48A of the platform 43. The axially abutting surface 48C of the platform 43 may axially engage a respective end plate 50, and such engagement may prevent axial movement of the platform 43 within the groove 36. Alternately, the end plates 50 can be replaced by an integral part of the rotor 30.

The above description is meant to be exemplary only, and one skilled in the art will recognize that changes may be made to the embodiments described without departing from the scope of the invention disclosed. For example, the biasing members need not be springs, per se, but rather any suitable apparatus having the functions described. The configuration of the springs shown are but one example of many possible configurations having the function(s) described. The multiple apex seals at each apex portion need not be identically configured, but may have any suitable individual configuration. Other configurations or geometries of the groove 36 and apex seal arrangement 40 may be contemplated, where components of the apex seal arrangement 40 and the groove 36 may cooperate as discussed herein to implement the apex seal radial stopper features, with or without the pressure equilibrium features discussed herein. Although described with respect to a Wankel configuration as an example, the described apparatus and method may be employed on any suitable rotary internal combustion engine or rotary machine, and is not limited to the Wankel configuration. Therefore, modifications which fall within the scope of the present invention will be apparent to those skilled in the art, in light of a review of this disclosure, and such modifications are intended to fall within the appended claims.

The invention claimed is:

1. A rotor assembly for a rotary internal combustion engine, the rotor assembly comprising:
   a rotor having a radial groove defined radially in a peripheral surface of the rotor, the groove having a depth and an intermediate shoulder at an intermediate depth, the groove having a first width therealong that is narrower than an intermediate width at the shoulder; and
   an apex seal received in the groove and protruding from the peripheral surface of the rotor, the apex seal configured to move radially between a first position and a second position outward of the first position, a biasing member biasing the apex seal toward the second position, and a platform disposed in the groove between the apex seal and the biasing member, the platform having a width greater than the first width, wherein the platform has a first and a second surface defined on opposed sides thereof, the first surface interfacing with the biasing member and the second surface interfacing with an underside surface of the apex seal.

2. The rotor assembly as defined in claim 1, wherein the second surface of the platform and the underside surface of the apex seal have a corresponding relief.

3. The rotor assembly as defined in claim 1, wherein the second surface of the platform is flat underneath the underside surface of the apex seal.

4. The rotor assembly as defined in claim 1, wherein the first surface of the platform and the shoulder of the groove defines a flat interface.

5. The rotor assembly as defined in claim 1, wherein the shoulder of the groove is a first shoulder, the groove defining a second shoulder radially outward relative to the first shoulder, the second surface of the plaftorm member engaging the second shoulder when the apex seal reaches the second radial position.

6. The rotor assembly as defined in claim 1, wherein the biasing member includes a leaf spring, the first surface of the platform defining a pair of longitudinally spaced apart notches to receive opposite longitudinal ends of the leaf spring.

7. The rotor assembly as defined in claim 1, wherein the biasing member includes a number of leaf springs disposed on one another, the first surface of the platform defining a corresponding number of pairs of longitudinally spaced apart notches to receive opposite longitudinal ends of respective leaf springs.

8. The rotor assembly as defined in claim 1, wherein the platform has opposite lateral edges extending along a length of the platform and spaced apart by a width of the platform, the width of the platform has at least one portion thereof that is greater than a width of the apex seal.

9. The rotor assembly as defined in claim 1, wherein the platform has opposite lateral edges extending along a length of the platform, the lateral edges engaging respective opposite lateral walls of the groove, at least one of the lateral edges defining an indentation extending from the first surface to the second surface of the platform, the indentation defining a gas passage within the groove, the gas passage being between the lateral edge of the platform and the opposite lateral wall of the groove.

10. The rotor assembly as defined in claim 1, wherein the apex seal arrangement has a unitary apex seal extending along a majority of a distance between opposed end faces of the rotor.

11. A rotary internal combustion engine comprising:
    a stator body having a cavity defined by two axially spaced apart end walls and a peripheral wall extending between the end walls;
    a rotor having two axially spaced apart end faces each extending in proximity of a respective one of the end walls of the stator body, and a peripheral face extending between the end faces and defining an apex portion, the rotor body being engaged to an eccentric shaft to rotate within the cavity with the apex portion remaining adjacent the peripheral wall;
    at the apex portion the rotor having a groove extending radially inwardly into the rotor, the groove defining a shoulder at a radial distance from a radial end of the groove;
    an apex seal received in the groove and protruding radially from the peripheral face of the rotor, the apex seal configured to move along the groove between a first radial position set by the shoulder and a second radial position radially outward relative to the first radial position;
    a biasing member received in the groove, the biasing member biasing the apex seal radially outwardly toward the second radial position; and
    a platform received in the groove between the apex seal and the biasing member, the platform engaging the shoulder of the groove when the apex seal reaches the first radial position.

12. The rotary internal combustion engine as defined in claim 11, wherein the platform has a first and a second surface defined on opposed sides thereof, the first surface interfacing with the biasing member and the second surface interfacing with an underside surface of the apex seal.

13. The rotary internal combustion engine as defined in claim 12, wherein the shoulder of the groove is a first shoulder, the groove defining a second shoulder radially outward relative to the first shoulder, the second surface of the plaftorm member engaging the second shoulder when the apex seal reaches the second radial position.

14. The rotary internal combustion engine as defined in claim 12, wherein the platform has opposite lateral edges extending along a length of the platform, the lateral edges engaging respective opposite lateral walls of the groove, at least one of the lateral edges defining an indentation extending from the first surface to the second surface of the platform, the indentation defining a gas passage between the lateral edge of the platform and the opposite lateral wall of the groove, the gas passage fluidly connecting opposed sides of the platform across the platform.

15. A method of operating an apex seal engaged in a radial groove at an apex portion of a rotor of a rotary internal combustion engine, the method comprising:

allowing a radial travel of the apex seal along the groove over a distance defined between a first radial position and a second radial position, biasing the apex seal radially outward toward the second radial position via a biasing member, and interfacing a platform with a shoulder defined in the groove at a radial distance from an end of the groove when the apex seal reaches the first radial position, the platform located between the apex seal and the biasing member.

16. The method as defined in claim 15, wherein the shoulder is a first shoulder and the platform has a first and a second surface defined on opposed sides thereof, the first surface interfacing with the first shoulder when the apex seal reaches the first radial position and the second surface interfacing with a second shoulder defined in the groove radially outward relative to the first shoulder when the apex seal reaches the second radial position.

17. The method as defined in claim 15, further comprising balancing a gas pressure on opposed sides of the platform via a gas passage fluidly connecting the opposed sides of the platform, the platform having a lateral edge in proximity with an opposite lateral wall of the groove, the gas passage defined by an indentation in the lateral edge of the platform and the opposite lateral wall of the groove.

18. The method as defined in claim 15, further comprising allowing a pressurized gas from a working chamber of the rotary engine to flow radially inward along the groove and through a gas passage defined within the groove and fluidly connecting opposed sides of the platform to limit a gas pressure differential between the opposed sides of the platform.

19. The method as defined in claim 15, wherein the platform has a first and a second surface defined on opposed sides thereof, the method further comprising limiting a pressure differential applied on the first surface and on the second surface of the platform.

* * * * *